United States Patent [19]

Goodrich

[11] 4,238,377

[45] Dec. 9, 1980

[54] POLYMERIZABLE PREMIX COMPOSITION FOR PREPARATION OF POLYURETHANE SURFACES

[75] Inventor: Judson E. Goodrich, San Rafael, Calif.

[73] Assignee: Chevron Research Company, San Francisco, Calif.

[21] Appl. No.: 45,577

[22] Filed: Jun. 4, 1979

[51] Int. Cl.³ .............................................. C08L 91/00
[52] U.S. Cl. ......................... 260/28 R; 260/28.5 AS; 528/48; 528/76
[58] Field of Search ...................... 260/28 R, 28.5 AS; 528/48, 76

[56] References Cited

U.S. PATENT DOCUMENTS

| | | | |
|---|---|---|---|
| 3,896,421 | 7/1975 | Flannery | 365/16 |
| 3,900,686 | 8/1975 | Ammons et al. | 428/425 |
| 3,900,687 | 8/1975 | Meader, Jr. et al. | 428/489 |
| 4,025,683 | 5/1977 | Meader, Jr. et al. | 428/425 |
| 4,036,797 | 7/1977 | Meader, Jr. | 260/28 R |

Primary Examiner—Melvyn I. Marquis
Attorney, Agent, or Firm—D. A. Newell; S. R. LaPaglia

[57] ABSTRACT

A method is provided for stabilizing a polymerizable premix composition for use in preparing a polyurethane surface and the resulting composition. An aromatic hydrocarbon resin is used to achieve the stabilization.

7 Claims, No Drawings

POLYMERIZABLE PREMIX COMPOSITION FOR PREPARATION OF POLYURETHANE SURFACES

BACKGROUND OF THE INVENTION

This invention relates to an asphalt-containing composition suitable for use in preparing an asphalt-extended polyurethane surface. More particularly, it relates to (1) a method for stabilizing a polymerizable mixture comprising a high molecular weight diol component, a low molecular weight chain stiffener component and an asphalt component, (2) the resulting composition, and (3) a process for preparing said surface using the stabilized mixture.

Polymerizable asphalt-extended mixtures, commonly called premixes, are known in the polyurethane art (see for example U.S. Pat. Nos. 3,869,421; 3,900,687; 4,025,683; and 4,036,797). They are used for the preparation of asphalt-extended polyurethane surfaces for bridge decks, industrial membranes, recreational surfaces, such as running tracks, tennis court surfaces and the like, canal or pond linings, liquid surface coverings as in tanks, ponds and the like, road surface elements and the like, to name but a number of representatives. In the preparation, polyisocyanate, usually aryl diisocyanate, is thoroughly admixed into the premix and the resulting polymerizable or polymerizing mixture is applied or used as desired. The resulting product is an asphalt-extended polyurethane surface.

However, a premix frequently suffers from a serious disadvantage. That is, while initially it may be formulated by thorough mixing into a solution or apparently homogeneous substance, for example a dispersion, upon standing two or more separate phases develop. In separated form, the mixture has little or no value as a premix. It is said to have an unsatisfactory shelf life. Thus, there is a need for an improved premix composition which is fully stabilized against phase separations or at least stabilized to such an extent as to exhibit an improved and satisfactory shelf life.

This invention is directed toward (1) a method for stabilizing a premix, (2) the composition resulting from (1) and (3) a process for preparing an asphalt-extended polyurethane surface using the composition of (2).

SUMMARY OF THE INVENTION

A method is provided for stabilizing, or improving the stability of, a polymerizable mixture comprising a high molecular weight diol component, a low molecular weight chain stiffener component and an asphalt component by including therein an effective amount of at least one stabilizing agent selected from the group consisting of substantially aromatic hydrocarbon resins and such resins containing a minor amount of chemically bonded oxygen, said resins having an average molecular weight in the range of from about 500 to 2000 and a ring and ball softening point in the range of from about 90° to 150° C. Optionally, and preferably, the stabilized mixture may also contain a polyisocyanate polymerization catalyst, an inert filler and one or more of the other materials conventionally included in a polyurethane surface, for example, carbon black, a drying agent, clay aggregates, etc.

A further aspect of the invention is the composition resulting from the above-described method.

A yet further aspect of the invention is a process for producing an asphalt-extended polyurethane surface wherein the above-described stabilized composition is admixed with an effective amount of a polyisocyanate component, preferably mainly aryl diisocyanate, and the resulting polymerizable or polymerizing mixture is applied to a substrate and polymerized.

EMBODIMENT

In a preferred embodiment a premix composition is prepared by admixing the following components in the indicated parts by weight:

| | |
|---|---|
| Arabian Light Residuum | 41.64 |
| Coumarone-Indene Resin | 10.40 |
| N,N-bis(2-hydroxypropyl) Aniline | 5.81 |
| Polybutadienediol (Ave. equivalent wt 1200) | 34.26 |
| Polyethylacrylate | .05 |
| Dibutyl Tin Dilaurate | .01 |
| Toluene | 7.83 |

The above resin is a commercial product of Neville Chemical Co. having a softening point range of about 93°–107° C., a molecular weight (number average by osmometry) of 760 and known as Cumar-R-16A (T.M.) resin.

Comparative storage stabilities of a representative stabilized premix of the above composition and the same mix less the coumarone-indene resin is as follows:

| Storage Stability | Stabilized | Unstabilized |
|---|---|---|
| 2 Months Sludge, Vol. % | 0 | 30 |

Substantially aromatic resins are effective stabilizers for unstable premix compositions.

By the term "storage stability" as used herein in connection with a polymerizable mixture containing a dispersed asphalt component is meant the period of time required for at least an appreciable amount of the asphalt of the mixture at ambient conditions to coagulate or to precipitate and coagulate as a separate phase.

By the term "polymerizable" as used herein in connection with a polymerizable mixture (a premix) suitable for use in preparing an asphalt-extended polyurethane surface is meant a composition having a Brookfield viscosity in the range 5,000 to 20,000, preferably 6,500 to 8,500 cp at 25° C. (Brookfield Viscometer Model RVF, Spindle No. 5, 20 rpm) and containing the following components:

I. A high molecular weight diol component characterized by (1) a molecular weight in the range of from about 1,000 to 3,000 units of weight and (2) hydroxyl groups located at or near (within about 4 carbon atoms) the terminal carbon atoms which are separated by an amorphous (relatively free of crystallizable areas), chain of at least about 40 carbon atoms; for example, polybutadiene diol, polyisoprene diol, polybutadiene-styrene diol, polybutadiene-acrylonitrile diol and the like high molecular weight diols;

II. A low molecular weight chain stiffener component selected from the group consisting of polyols, polyamines and hydroxylamines characterized by (1) being mainly difunctional but can contain 5–25, preferably 5–10, equivalent percent of tri- and higher-order-functionality molecules, (2) a separation of the hydroxyl and/or amine groups of the molecules by from 2 to about 12 atoms, (3) a carbon atom content in the range of from about 2 to 18, (4) a molecular weight in the range of from about 62 to 300, (5) atoms between the hydroxyl and/or amine groups which besides carbon may be oxygen, nitrogen or sulfur and (6) less than 3 heteroatoms; for example, such chain stiffeners as 3-dimethyl amino-1,2-propanediol, 1,4-di-(hydroxymethyl)cyclohexane, 1,4-butanediol, 4,4'methylene-dianiline, diethanolamine, tolidine, 3-methyl-1,5-pentanediol, trimethylolpropane, glycerine, N,N,N',N'-tetrakis(2-hydroxypropyl)ethylenediamine and N,N-bis(2-hydroxypropyl)aniline; and III. An asphalt component characterized by (1) a softening point (ASTM-D 36-56) in the range of from about 25° to 65° C.; (2) a viscosity at 60° C. in the range of from about 100 to 8,000 poise and at 135° C. in the range of from about 50 to 900 cp; and (3) an amount in the range of from 2 to 30 volume percent thereof of a low boiling diluent in an amount sufficient to provide the aforementioned viscosity, preferably a largely aliphatic fraction having a boiling range midpoint in the range of about 110°–140° C.; for example natural asphalts such as a steam reduced asphalt, a petroleum crude still bottoms (a topped crude) and/or a cut-back asphalt containing the above-described hydrocarbon diluent;

wherein the mixture contains an amount by weight of (I) in the range of from about 18 to 50 percent, an amount of III in the range of from about 30 to 80 percent and an amount of II sufficient to provide a mol ratio of isocyanate reactive groups of II to the isocyanate reactive groups of I which is in the range of from about 1 to 8, respectively.

The mixture may also contain, and desirably does contain, a minor amount of a catalyst ordinarily used for curing a polyurethane, for example, dibutyl tin dilaurate, diazabicyclooctane, stannous octoate and the like. The dilaurate is preferred.

The mixture may also contain inert additives or fillers normally employed in the preparation of polyurethane surfaces, coatings and the like, for example, carbon black, driers, fillers such as clay, rubber aggregate and the like.

The term "asphalt" is used herein in its commonly accepted meaning. See for example pages 56 and 57 of "Asphalts and Allied Substances" by Herbert Abraham, Vol. I, 4th Edition, D. Van Nostrand Co. Inc., 1938.

Aromatic Resin

Hydrocarbon resins having at least a substantial aromaticity and such resins containing a minor amount of chemically bonded oxygen are, in general, suitable for use herein, provided that their molecular weight is in the range of from about 500 to 2000 and they soften/melt at a temperature in the range of from about 90° to 150° C. The more satisfactory results herein are achieved when the resin exhibits at least an appreciable (10% by weight) solubility in toluene, xylenes and the like.

They are known in the art and used for many purposes, for example as adhesives, coatings, closure and paper components, and of themselves are not considered inventive herein.

Aromatic resinous polymers are prepared by a variety of reactions using a mixture of a variety of monomers, such as indene, benzofuran, styrene, alpha-methylstyrene, vinyl acetate, cyclopentadiene and the like polymerizable hydrocarbon and oxygen-containing hydrocarbon monomers. Strong acid and Friedel-Crafts type catalysts are frequently employed (see for example, Encyclopedia of Chemical Technology, Kirk-Othmer, Second Edition, Vol. II, pps. 242–262 and the references cited therein).

Representative commercially available resins suitable for use herein include

| Trade Name | Supplier | Composition | Softening Range, °C. | Average Mol. Wt. |
|---|---|---|---|---|
| CUMAR R-16A | Neville Chemical | Coumarone-Indene Resin | 93–107 | 760 |
| NEVCHEM 100 | Neville Chemical | Alkylated Aromatic Resin | 100–107 | 770 |
| CUMAR R-1 | Neville Chemical | Coumarone-Indene Resin | 126 | 731 |
| CUMAR R-9 | Neville Chemical | Coumarone-Indene Resin | 108–117 | 615 |
| NEVCHEM 140 | Neville Chemical | Alkylated Aromatic Resin | 136–145 | 1110 |
| PICCO 6100 | Hercules Inc. | Aromatic Resin | 100 | — |
| PICCOMER 110 | Hercules Inc. | Aromatic Resin | 110 | — |
| PICCOUMARON 110 | Hercules Inc. | Polyindene Resin | 111 | — |

The amount of the resin required to improve storage stability of a premix varies depending upon the particular asphalt component and resin employed. In general, a satisfactory premix having enhanced storability is obtained, when the amount of resin, based by weight upon the asphalt, is in the range of from about 5 to 30, preferably 10 to 20 percent. Enough resin should be used to provide at least a substantial (20 percent) increase in the storage stability (shelf life) of the premix.

Diluent/Solvent

The premix contains an inert volatile solvent or diluent as required to provide the premix with a viscosity in the range 5,000 to 20,000, preferably 6,500 to 8,500 cp. A viscosity in this range is necessary to facilitate the handling and spreading characteristics of the premix composition. Suitable diluents include toluene, xylenes, low boiling ketones, such as methyl ethyl ketone, hexane, heptane, cyclohexane and the like. Preferably, and for reasons of cost, a preferred diluent is a largely aliphatic low-boiling petroleum refinery fraction or cut having a midpoint of its boiling range in the range of from about 110°–140° C.

Polymerization

The preparation of an asphalt-extended polyurethane surface, of itself, is known and not considered to be inventive (see, for example, the above-cited U.S. patents). Briefly, a premix plus one or more inert fillers, if desired, is admixed with a polyisocyanate is an amount sufficient to provide in the resulting mixture a ratio of isocyanate group to isocyanate reactive groups (hereinafter referred to as the NCO/OH ratio) in the range of about 0.8–1.4 to 1, preferably 1.05–1.15 to 1, respectively. Where polyisocyanate may be lost due to diffusion from the mixture or for other ordinary reasons, use of a slightly higher NCO/OH ratio may be desirable.

The polyisocyanates will generally be diisocyanates or mixtures of diisocyanates with higher orders of polyisocyanates, normally not exceeding 5 isocyanate groups. Usually, in mixtures of di- and higher order polyisocyanates, the higher order polyisocyanates will be present in not more than 50 equivalent percent, usually not more than 20 equivalent percent. Preferably, diisocyanates are used. The higher order polyisocyanates (greater than di-) have at least 12 carbon atoms and usually do not exceed 46 carbon atoms. The diisocyanates generally vary from about 6 to 24 carbon atoms.

Illustrative polyisocyanates include diphenyl diisocyanate, bis(isocyanatophenyl)methane, 1,5-naphthalene diisocyanate, polyphenyl polymethylene isocyanate (PAPI, supplied by Upjohn Co.), tolylene diisocyanate (TDI), hexamethylene diisocyanate, dodecamethylene diisocyanate, 1,4-diisocyanatocyclohexane, poly(methylene phenylene polyisocyanate). Bis(isocyanatophenyl)methane, for example Isonate (trademark) 143L supplied by Upjohn Polymer Chemicals Co., is preferred.

The following examples are for further illustration, but not limitation, of the invention. All parts, unless otherwise specified, are by weight.

EXAMPLES

In the following examples 1–7 a premix was prepared using an Arabian Light residuum asphalt having a viscosity at 60° C. of about 120 poise. The high molecular weight diol component (HMDIOL) was a polybutadiene diol of average molecular weight 2500–2800. The stiffener was N,N-bis(2-hydroxypropyl)aniline and the catalyst was dibutyl tin dilaurate. For purposes of comparison three premix formulations were employed:

| Formulation Type Components, Parts: | I | II | III |
|---|---|---|---|
| Asphalt | 56.47 | 45.18 | 37.79 |
| Resin | None | 11.29 | 9.46 |
| HMDIOL | 37.17 | 37.17 | 38.69 |
| Stiffener | 6.30 | 6.30 | 6.56 |
| Polyethyl Acrylate | .05 | .05 | .05 |
| Catalyst | .01 | .01 | .01 |
| Toluene | — | — | 7.44 |

In Table I premix compositions containing a variety of resin modifiers are listed, the storage stability results obtained for them, and polymerization results using the premix and 12–14 g of (Isonate 143L) polyisocyanate per 100 g of diluted premix.

TABLE I

| Example No. | 1 | 2 | 3 | 4 | 5 | 6 | 7 |
|---|---|---|---|---|---|---|---|
| Resin | None | Aliph[1] | H-C Natural[2] | H-C Aromatic[3] | H-C Aromatic[4] | Coumarone[5] | Polyterpene[6] |
| Softening Temp. °C. | — | — | 180 | 75 | 100–107 | 93–107 | 98–104 |
| Formulation Type | I | II | II | II | III | III | III |
| Initial Brookfield Vis., 25° C., cp | 32,500 | 100,000 | 73,600 | (Heavy Sludge) | 5,520 | 5,320 | 9,300 |
| Added Toluene, g/100g mix | 6.0 | 8.5 | 9.5 | — | — | — | — |
| Final Brookfield Vis., 25° C. cp | 7,200 | 7,360 | 7,360 | — | — | — | — |
| Premix Storage Stability | | | | | | | |
| 1 Week | | | | | | | |
| Appearance | Heavy Gel | Surface Crust | Surface Crust | (Heavy Sludge) | Smooth | Smooth | Heavy Sludge |
| 10 Weeks | | | | | | | |
| Appearance | Heavy Sludge | Heavy Sludge | Heavy Sludge | (Heavy Sludge) | Smooth | Smooth | Heavy Sludge |
| POLYMERIZED PREMIX | | | | | | | |
| Physical Properties of Cured Membrane | | | | | | | |
| Tensile Strength, psi | 662 | 328 | 521 | — | 613 | 611 | 480 |
| Initial Modulus psi | 600 | 430 | 1,400 | — | 510 | 550 | 720 |
| Elongation to Break % | 603 | 407 | 390 | — | 398 | 373 | 318 |
| Tear Strength, ppi | | | | | | | |
| 2-ipm | 28 | 28 | 37 | — | 34 | 30 | 35 |
| 20-ipm | 27 | 37 | 51 | — | 38 | 36 | 41 |
| Shore A Hardness | 55 | 54 | 67 | — | 64 | 65 | 65 |

FOOTNOTE:
[1] An aliphatic petroleum hydrocarbon resin; Piccotac D of Hercules Incorporated.
[2] A natural aliphatic resin; Blackhawk 500 of Hercules Incorporated.
[3] Polymer of styrene and related monomers, Piccolastic E-75 of Hercules Incorporated.
[4] Alkylated aromatic resin; Nevchem 100 of Neville Chemical Co.
[5] Coumarone-indene resin; CUMAR R-16A of Neville Chemical Co.
[6] Synthetic polyterpene; NEVTAC 100 of Neville Chemical Co.

From a comparison of the data in Table I, it is evident that a premix modified by a substantially aromatic resin or an oxygen-containing aromatic resin having suitable characteristics as prescribed above exhibits excellent storage stability, especially relative to an unstablized premix (Examples 5 and 6 vs. 1) or to aliphatic resin modified premixes (Examples 5 and 6 vs. 2, 3 and 7) or an unsatisfactory (low softening temperature, etc.) aromatic hydrocarbon resin (Examples 5 and 6 vs. 4).

What is claimed is:
1. A method for improving the storage stability of a polymerizable mixture comprising a high molecular weight diol component, a low molecular weight chain stiffener component and an asphalt component which comprises at least substantially increasing said stability by admixing into said mixture an effective amount to improve storage stability of at least one stabilizing agent selected from the group consisting of substantially aromatic hydrocarbon resins and said resins containing a minor amount of chemically bonded oxygen, said resins having an average molecular weight in the range of from about 500 to 2000 and a softening temperature in the range of from about 90° to 150° C.

2. A method as in claim 1 wherein said resin is a coumarone-indene resin.

3. A method as in claim 1 wherein said resin is an alkylated aromatic hydrocarbon resin.

4. A method as in claim 1 wherein an amount of said resin, based by weight upon said asphalt component, is in the range of from about 5 to 30 percent.

5. In a polymerizable mixture comprising a high molecular weight diol component, a low molecular weight chain stiffener component and an asphalt component, wherein said asphalt is present in the form of an unstabilized dispersion, solute or sol, the improvement comprising said mixture containing an effective amount to improve storage stability of at least one stabilizing agent selected from the group consisting of substantially aromatic hydrocarbon resins and said resins containing a minor amount of chemically bonded oxygen, said resins having an average molecular weight in the range of from about 500 to 2000 and a softening temperature in the range of from about 90° to 150° C.

6. A mixture as in claim 5 wherein said resin is a coumarone-indene resin.

7. A mixture as in claim 5 wherein said resin is an alkylated aromatic hydrocarbon resin.

* * * * *